(No Model.) 3 Sheets—Sheet 1.
L. H. DWELLEY.
COMBINED HAY RAKING AND LOADING DEVICE.

No. 408,799. Patented Aug. 13, 1889.

(No Model.) 3 Sheets—Sheet 2.
L. H. DWELLEY.
COMBINED HAY RAKING AND LOADING DEVICE.
No. 408,799. Patented Aug. 13, 1889.
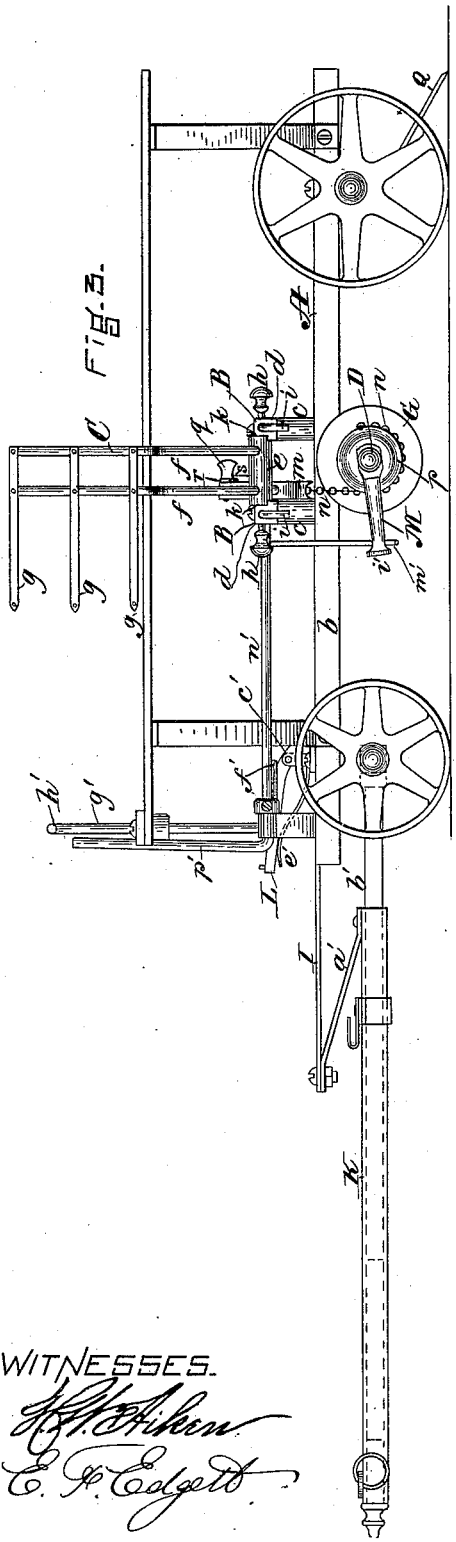
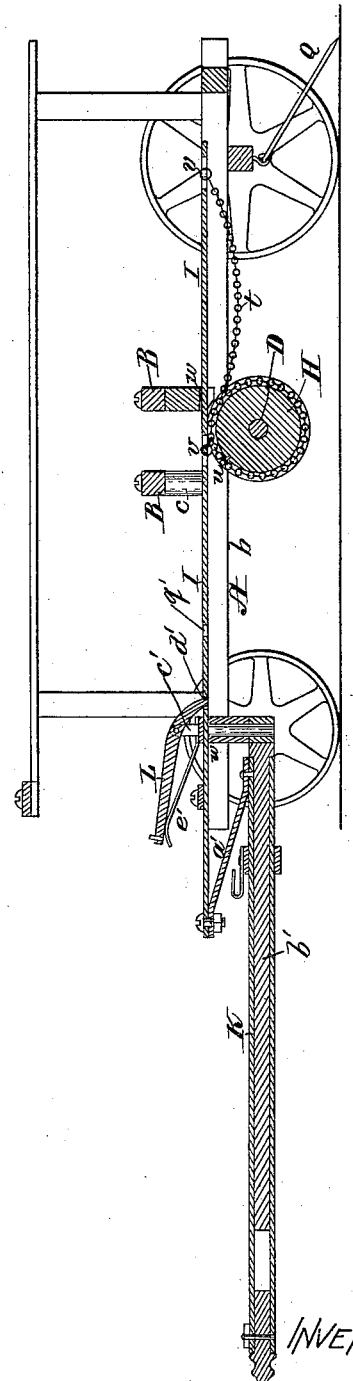
WITNESSES. INVENTOR

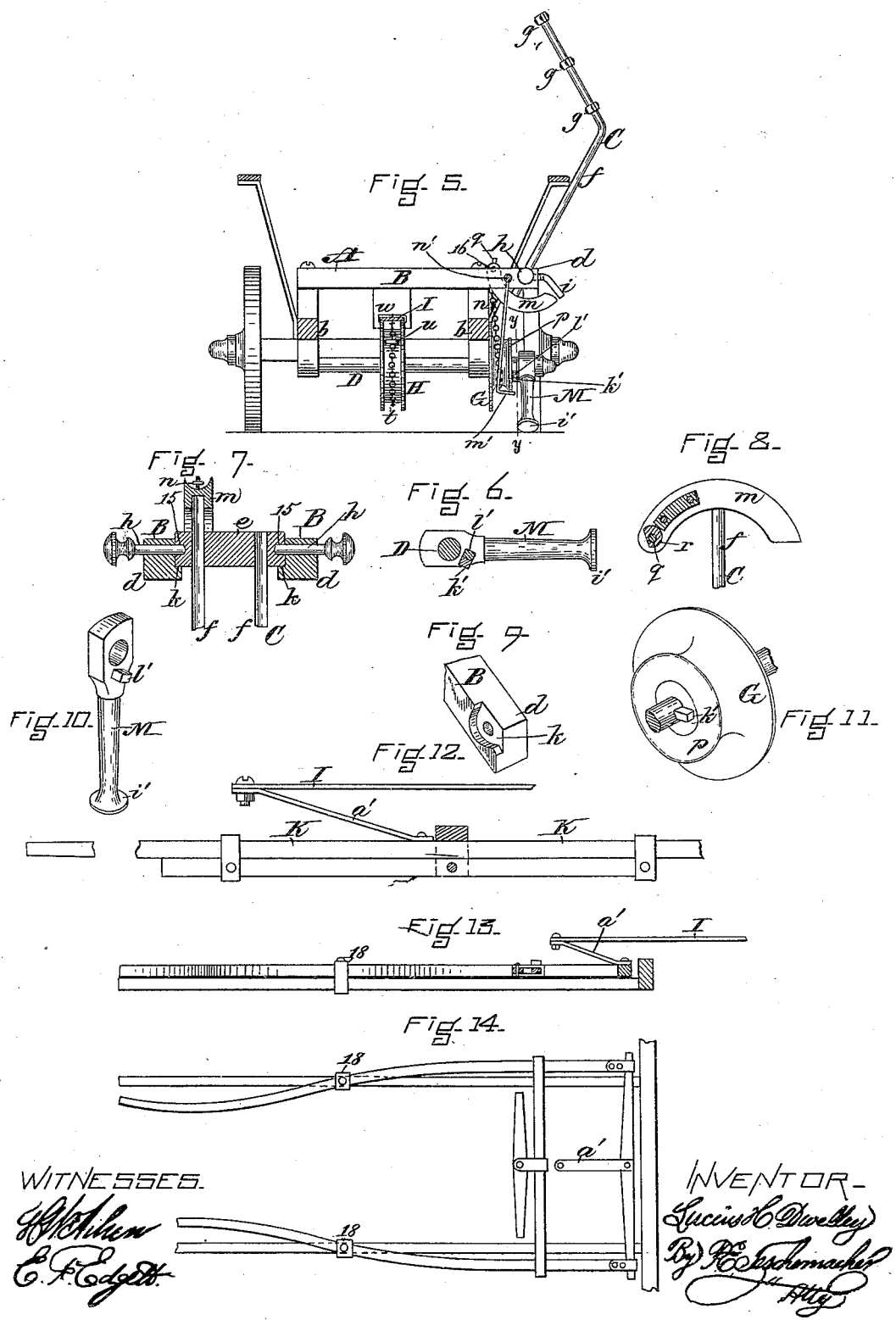

UNITED STATES PATENT OFFICE.

LUCIUS H. DWELLEY, OF FOXCROFT, MAINE.

COMBINED HAY RAKING AND LOADING DEVICE.

SPECIFICATION forming part of Letters Patent No. 408,799, dated August 13, 1889.

Application filed November 26, 1888. Serial No. 291,906. (No model.)

*To all whom it may concern:*

Be it known that I, LUCIUS H. DWELLEY, a citizen of the United States, residing at Foxcroft, in the county of Piscataquis and State of Maine, have invented certain Improvements in Combined Hay Raking and Loading Devices for Wagons and Carts, of which the following is a full, clear, and exact description, reference being had to the accompanying drawings, making part of this specification, in which—

Figure 1:
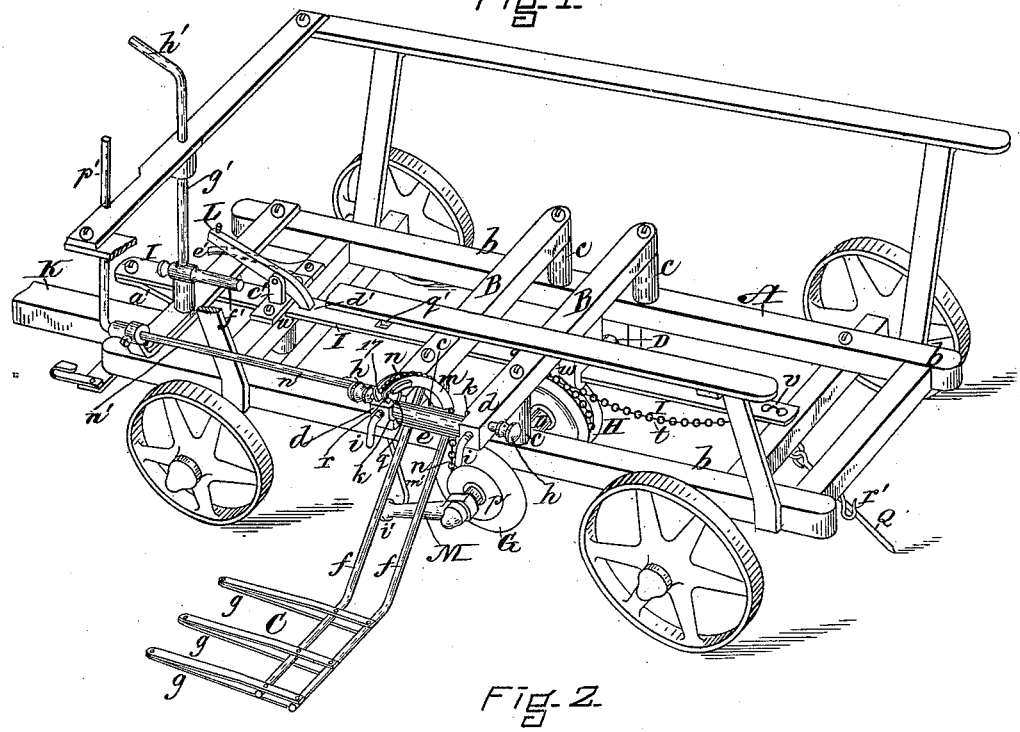
Figure 2:
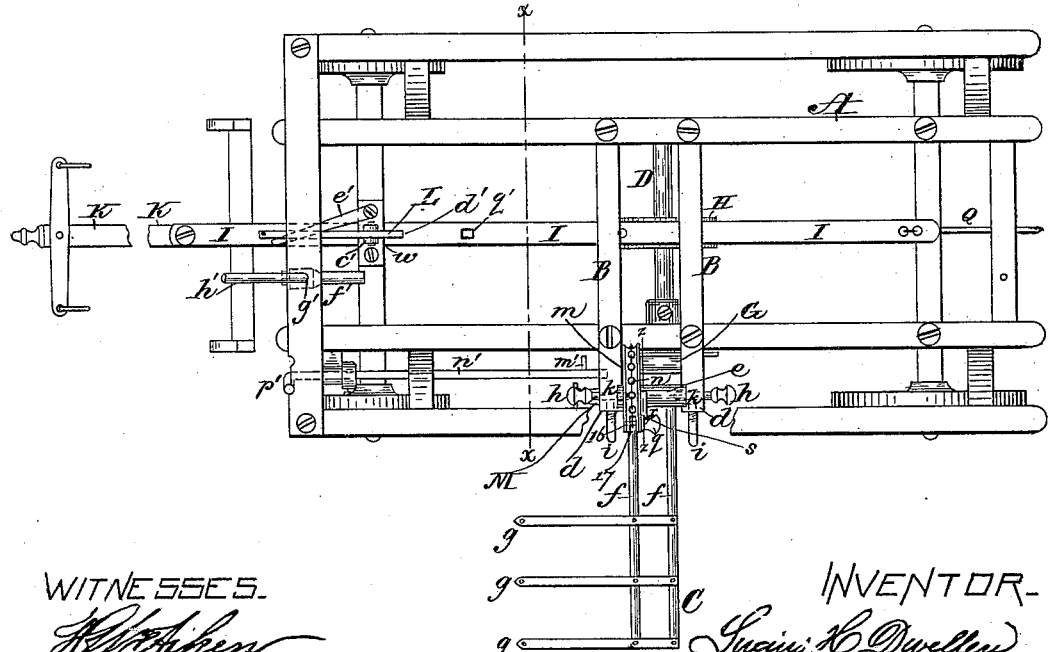

Figure 1 is a perspective view of a hay-wagon having my improved hay raking and loading mechanism applied thereto. Fig. 2 is a plan of the same. Fig. 3 is a side elevation of the same. Fig. 4 is a longitudinal vertical section through the center of the same. Fig. 5 is a transverse vertical section on the line $xx$ of Fig. 2, the rake being shown raised. Fig. 6 is a sectional detail on the line $yy$ of Fig. 5, looking outward. Fig. 7 is a sectional detail, enlarged, of the upper portion of the rake, its carrier-shaft, and the bearings in which it is supported. Fig. 8 is a sectional elevation, enlarged, on the line $zz$ of Fig. 2; Figs. 9, 10, and 11, details. Figs. 12, 13, and 14 represent modifications to be referred to.

Hay wagons and carts have heretofore been provided with automatic or self-loading attachments or devices which have usually consisted of a rake pivoted to the wagon and connected by suitable mechanism with the wheels or axles by which it was operated at the required time to raise the hay gathered thereon and deposit it in the wagon. These devices, while they served a good purpose, did not operate with perfect success, as the jolting of the wagon often caused the dropping of some of the hay from the rake while being raised, and, furthermore, in loading from a windrow a portion of the same was left untouched during that portion of the forward movement of the wagon in which the rake was being raised to lift its load of hay and deposit it in the wagon.

My invention has for its object to overcome these difficulties, and to provide a simple and effective hay-loading device which can be easily and cheaply applied to wagons and carts, and which is adapted to be operated while the wagon is stationary by the forward movement of the draft-pole or thills, which are constructed to slide forward independently of the wagon to which they are attached, and are connected with the mechanism by which the rake is operated, by which construction the animal or animals attached to the wagon are relieved of the labor of drawing it with its load while lifting the hay gathered by the rake, and the liability of the hay falling off from the latter while being raised is also avoided, while, as the wagon remains at rest during this operation, no part of the windrow is passed by the wagon while the rake is off the ground, thus enabling the operation of raking and loading hay to be performed in a more perfect and satisfactory manner than heretofore.

In the said drawings, A represents an ordinary four-wheeled hay-wagon, from the longitudinal sills $b\ b$ of which at or near the center rise four short posts $c$, upon the upper ends of which are secured two transverse bars B B, which project out on one side of the wagon beyond the sill $b$. Between the projecting ends $d$ of the bars B is pivoted the horizontal carrier-shaft $e$ of the rake or loading device C, which is composed of two parallel arms or rods $f\ f$, bent as shown, so that their lower portions will be on or near to the ground when in the position seen in Fig. 1, said rods being provided with a series of rake-teeth $g$, projecting out at right angles therefrom. This rake is adapted as the wagon is driven forward to rake up or gather a mass of hay from a windrow or take up an entire cock of hay as it passes beneath it, being free to rise and fall, and thus adjust itself to any inequalities of the surface of the ground as it is carried forward by the wagon under the hay to be gathered.

The carrier-shaft $e$ is provided at its opposite ends with central sockets or cavities 15, for the reception of removable pivots or pins $h$, which pass through the ends of the bars $d$, and are held in place by clamping-screws $i$, and by the employment of these removable pivots the rake can be easily and quickly detached from the wagon whenever desired and again replaced.

In order that the rake may be quickly placed in the exact position required to receive the pivots $h$, the ends $d$ of the bars B are cut away on the inner side to form semicircular guiding-recesses $k$, concentric with the pivot-holes in the bars and of the same diameter as the carrier-shaft, whereby, when the ends of said carrier-shaft are dropped into these semicircular recesses, the sockets 15 in the ends of the carrier-shaft $e$ will be exactly in line with the holes in which the pivots $h$ are inserted, thereby greatly facilitating the operation of attaching the rake to the wagon.

To one end of the carrier-shaft $e$ is secured a segmental sheave $m$, having a grooved periphery, to which is secured one end of a rope or chain $n$, the opposite end of which is attached to the load-lifting wheel G, which is provided on one side with a portion $p$ of smaller diameter, having a groove for the reception of said chain $n$. In order that the chain $n$ may be quickly attached to or detached from the end of the segmental sheave $m$, I secure it thereto by means of a pin $q$, which passes through an aperture 16 and also across a slot 17 in the end of the sheave, in which fits one of the links of the chain $n$, through which the pin $q$ also passes, as seen in Figs. 2 and 5. This pin is provided immediately under its head with an eccentric flange $r$, which is cut away on one side to allow it to be pushed in beyond the end of a lip or projection $s$ on one side of the sheave $m$, the pin being locked in place by partially revolving it, which causes the flange $r$ to pass under the lip $s$ and bear tightly against the same, whereby the pin is held securely in place, as seen in Figs. 1, 2, and 8.

The wheel G is secured to one end of a transverse shaft D, mounted in hangers attached to the sills $b$ $b$, and to this shaft D, in line with the center of the wagon, is secured a grooved drum or pulley H, around which passes a chain $t$, secured thereto or prevented from slipping thereon by a clamping-screw $u$, or other suitable device. The opposite ends of this chain $t$ are attached at $v$ $v$ to a longitudinal bar I, which slides backward and forward in suitable guides $w$ $w$, the forward end of this reciprocating bar I being connected by means of a link or bar $a'$ with the sliding tongue or pole K of the wagon, to which the horses are attached in the ordinary manner, and thus when this pole K is drawn forward, as hereinafter described, it will carry with it the sliding bar I, which, by means of the chain $t$, will rotate the pulley H and load-lifting wheel G, which thus causes the rake C with its load of hay to be raised in the arc of a circle into a vertical or nearly vertical position, when the hay will be discharged into the wagon, as desired, dropping by its own gravity as soon as the rake has been lifted to the required height. The pole K is then returned to its normal position by backing the horses, causing the bar I to be moved backward, and the pulley H and wheel G to be rotated in the opposite direction, when the weight of the rake will cause it to descend to the ground and assume the position seen in Figs. 1 and 2, ready to receive another load, the weight of the rake as it descends assisting the team to force back the sliding bar I. By thus connecting the bar I to the sliding tongue or pole K of the wagon by means of a link or bar $a'$, pivoted at one end to the pole and at its opposite end to the bar, as shown, it will be obvious that the latter can be operated in either direction when the pole is at an angle therewith, as the link will accommodate itself to the position of the parts and transmit the power to the bar I, whether the pole is in line therewith or at an angle thereto. The sliding tongue or pole K is preferably made in the telescopic form shown, being hollow, and sliding over a guide-bar $b'$, secured to the forward axle of the wagon; but it is obvious that the pole could be solid and made to slide on a guide-bar and through an aperture in the axle or beneath the same, as seen in Fig. 12, without departing from the spirit of my invention. It is also obvious that a rack and gear could be substituted for the chain $t$ and pulley H for communicating the motion of the sliding bar I to the shaft D.

In order that the wagon may be drawn forward without sliding or drawing out the pole K, the sliding bar I is retained securely in the position which it occupies when the rake is on the ground by a dog or lever L, which is pivoted to a bracket $c'$ and engages at its lower end with an aperture $d'$ in the bar I, thus locking the latter securely in place, the dog being raised against the resistance of a spring $e'$ when it is desired to release the bar I and operate the rake by an arm $f'$ on a vertical shaft $g'$, which is provided with a crank or handle $h'$, conveniently arranged in a position accessible to the driver of the wagon.

When the wagon is light or without its load, it would be drawn forward by the team after the dog L has released the sliding bar I, and prevent the rake with its load from being raised, were it not for the employment of some device to arrest the forward movement of the wagon. To accomplish this I provide a dog or stop M, which consists of a bar pivoted at its upper end upon the end of the shaft D, so as to turn freely thereon, and having an enlargement or foot $i'$ at its bottom, as seen in Figs. 5, 6, and 10. This dog M is allowed to drop to the ground into the position seen in Fig. 5 just previous to the raising of the rake, when, by reason of its angular position, it will act as a stop and prevent the wagon from being moved forward while the rake is being raised with its load. As the rake returns to the ground after discharging its load into the wagon, a lug or projection $k'$ on the side or hub of the wheel G is brought into contact with a lug or projection $l'$ on the inner side of the upper end of the dog M, causing the latter to be forcibly raised from the ground by the time the sliding bar I has been pushed back by the team sufficiently to allow the dog L to enter the retaining notch or aperture $d'$, when the bar I will be locked and held fast, so that the wagon can be drawn forward by the team to enable the rake to gather a new load, after which the driver, by means of the crank-handle $h'$, withdraws the dog L from the aperture $d'$ and releases the bar I, which is then drawn forward with the sliding pole K by the team, when the rake is again raised to discharge its load into the wagon, and the operation continued as before. When the rake has reached the ground, the bar I has not quite reached the end of its backward movement, and as it continues to move backward after the rake has reached the ground the chain $n$ is somewhat slackened by the movement of the wheel G in raising the dog M, as previously described. By thus causing the chain $n$ to be slackened as the dog M is being raised it follows that when the sliding bar I is released and again commences to move forward the wheel G will be turned sufficiently to carry its lug or projection $k'$ backward out of the way of the lug $l'$ on the dog M, thus allowing the lower end of said dog to fall to the ground by its own gravity before the chain $n$ becomes taut and commences to raise the rake with its load, and in this manner the wagon is automatically stopped and prevented from being pulled forward by the team while the load is being raised by the rake and discharged into the wagon, the dog M being found in practice to be more effective and certain in its operation than a brake applied to the wagon-wheels.

In order that the rake may be partially raised to pass over any obstruction in its path without letting the dog M fall to the ground, which would stop the wagon, I have provided a hook $m'$, depending from a horizontal shaft $n'$, supported in suitable bearings and provided with an upwardly-extending lever or handle $p'$, placed in a convenient position to be operated by the driver, who, when he wishes to raise the rake to pass over a rock or other obstruction on the ground, vibrates the hook $m'$ into a position to catch and hold the dog M up from the ground. He then raises the dog L out of the aperture $d'$ in the sliding bar I, when the latter is drawn forward by the team until a second notch or aperture $q'$ is brought beneath the end of the dog L, which then drops into this notch, thus enabling the team to draw the wagon forward, the rake having been raised by this short forward movement of the bar I sufficiently to pass over the obstruction, after which the team is stopped and backed sufficiently to force the sliding bar I back to its normal position, thus allowing the rake to again fall to the ground, after which the hook $m'$ is moved to release the dog M, which is then free to be operated in the manner previously described.

If the wagon is to be drawn by a single horse instead of a pair, sliding shafts or thills would be of course substituted for the sliding pole K. These shafts or thills would in such case be made double, one pair being of the usual form and made to slide upon a pair of straight bars secured to the axle of the wagon, as illustrated in Figs. 13 and 14, the sliding shafts being held in place upon the straight bars by means of suitable guide-straps 18.

To the rear axle of the wagon is pivoted a pointed bar or dog Q, which, when the wagon is going uphill in loading, may be dropped to the ground, as seen in Fig. 1, and as this dog is of sufficient length to cause it to be inclined rearwardly and downwardly it will act as a stop and effectually prevent the wagon from running backward. When not required for use, this dog can be held up out of the way by a hook $r'$, placed in a convenient position to receive its free end.

A hay-wagon provided with the mechanism above described presents the following advantages: It is at rest while the hay is being loaded onto it, which prevents the hay while being raised from being dropped off the rake by the jolting of the wagon. A whole windrow may be taken up by going over it once, which could not be accomplished if the wagon was moving forward while the load was being put on. The team has only the load on the rake to lift, whereas if the wagon was not stationary the team would not only have to lift the load on the rake, but at the same time draw the wagon and the hay already loaded thereon. Furthermore, the load can be built up better on the wagon if it is at rest while the hay is being received.

Although the above-described mechanism is intended principally to operate as an attachment for hay wagons or carts, it is evident that it may be applied to other wagons or carts and be adapted to load the same with substances other than hay without departing from the spirit of my invention.

What I claim as my invention, and desire to secure by Letters Patent, is—

1. The combination, with a wagon or cart provided with a sliding pole or thills connected with and adapted to operate a rake or loading device pivotally attached to the side of the wagon or cart, substantially as described, of an automatically-operated dog or stop adapted to arrest the forward motion of the wagon when the rake or loading device is to be raised to discharge its load, substantially as described.

2. The combination, with a wagon or cart, of a sliding pole or thills, a rake or loading device pivotally attached to the side of the wagon or cart, a longitudinally-movable bar connected with and operated by the pole or thills, a rotating shaft connected with and operated by the longitudinally-movable bar and carrying a load-lifting wheel, a chain or rope operated by the load-lifting wheel, connected to and operating the rake or loading device, substantially as described, and a dog or stop for locking the sliding bar while the wagon is moving forward, and releasing the said bar when the rake or loading device is to be raised, substantially as set forth.

3. The combination, with a wagon or cart, of a sliding pole or thills, a rake or loading device pivotally connected to the side of the wagon or cart, the longitudinally-movable bar I, connected to the sliding pole or thills by a link or bar $a'$, the transverse shaft D, carrying the drum or pulley H and load-lifting wheel G, the chain $t$, passing around the pulley H and secured at its opposite ends to the bar I, the chain or rope $n$, operated by the load-lifting wheel and connected to and operating the rake or loading device, and the dog or lever L, operated by the arm $f'$ on the crank-shaft $g'$, and adapted to enter apertures or notches in the bar I, whereby the latter is locked and released, all operating substantially in the manner and for the purpose set forth.

4. The combination, with a wagon or cart provided with a raking or loading device pivotally connected to its side and operated, while the wagon is at rest, by the forward movement of the sliding pole or thills connected therewith, of a dog or stop adapted to be automatically released and dropped to the ground to arrest the forward motion of the wagon just previous to the elevation of the rake or loading device, and to be automatically raised from the ground to allow the wagon to move forward on the descent of the rake, substantially as set forth.

5. The combination, with the load-lifting wheel G, having a lug or projection $k'$ on its side, of the pivoted dog or stop M, provided with a lug or projection $l'$, adapted to be engaged by the lug $k'$, whereby the said dog is forcibly raised from the ground to release the wagon on the descent of the rake or loading device and permitted to drop and engage with the ground just previous to the lifting of the rake with its load, substantially as set forth.

6. The combination, with the wheel G and the dog M, operating as described, of the hook $m'$, operated by the lever $p'$ and adapted to engage and hold up the dog M while the rake or loading device is being raised to pass over an obstruction, substantially as set forth.

7. The combination, with the rake or loading device and its carrier-shaft $e$, mounted on the wagon or cart and provided with end sockets or cavities 15, of the removable pivots or pins $h$, adapted to enter the sockets 15, and the clamping-screws $i$, for holding said pins in place, substantially as described.

8. The combination of the carrier-shaft $e$, mounted on the wagon or cart between supports provided with semicircular guiding-recesses $k$, formed around and concentric with the pivot-holes, and the pivots or pins $h$, fitting into sockets or cavities in the ends of said carrier-shaft $e$, substantially as and for the purpose set forth.

9. The segmental sheave $m$, provided with an aperture 16 and slot 17, in combination with the pin $q$, having an eccentric flange $r$, and the lip or projection $s$ on the side of the sheave, with which the flange $r$ engages to hold the pin $q$ securely in place, substantially as described.

10. The combination, with a wagon or cart having a rake or loading device pivotally connected to its side and operated by a sliding pole or thills, whereby it is raised with its load while the wagon remains stationary, as described, of the pivoted dog Q, adapted to engage with the ground and prevent the backward movement of the wagon when going uphill in loading, substantially as described.

11. The combination, with the sliding pole or thills and the longitudinally-movable bar I, adapted to operate the rake or loading device, substantially as described, of the connecting link or bar $a'$, pivoted at one end to the pole or thills and at the opposite end to the bar I, whereby the latter may be operated when the pole or thills are at an angle therewith, substantially as set forth.

Witness my hand this 20th day of November, A. D. 1888.

LUCIUS H. DWELLEY.

In presence of—
 FRANK E. GUERNSEY,
 ZENUS B. POOL.